(No Model.)
M. V. MONARCH.
Fermenting Vat.
No. 232,746.    Patented Sept. 28, 1880.
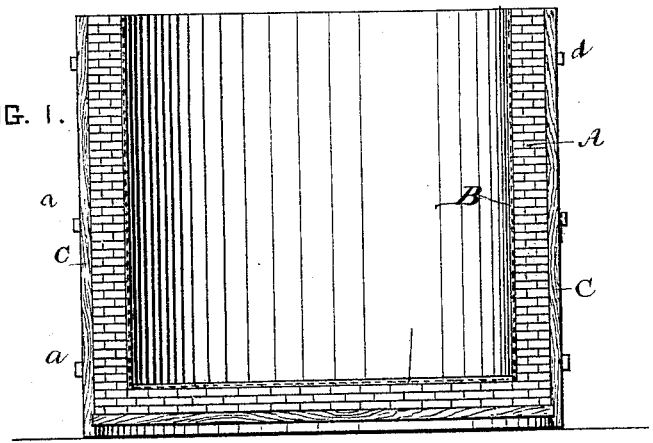
FIG. I.
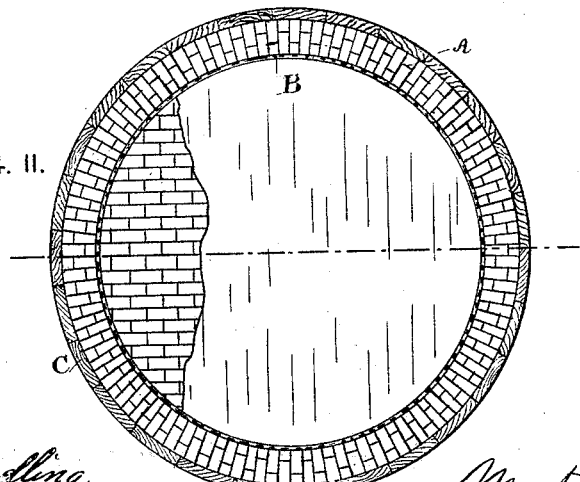
FIG. II.
WITNESSES
John Handling.
E. H. Tyler.
INVENTOR,
Martin V. Monarch

UNITED STATES PATENT OFFICE.

MARTIN V. MONARCH, OF OWENSBOROUGH, KENTUCKY.

FERMENTING-VAT.

SPECIFICATION forming part of Letters Patent No. 232,746, dated September 28, 1880.

Application filed April 21, 1880. (No model.)

*To all whom it may concern:*

Be it known that I, MARTIN V. MONARCH, a citizen of the United States, residing at Owensborough, in the county of Daviess and State of Kentucky, have invented certain new and useful Improvements in Fermenting-Vats for containing mash, wort, or wash of grain, &c., for producing distilled spirits; and I do hereby declare the following to be a full, clear, and exact description of the invention, such as will enable others skilled in the art to which it appertains to make and use the same, reference being had to the accompanying drawings, which form a part of this specification, and in which—

Figure I is a vertical section of my improved vat, and Fig. II is a horizontal section of the same, showing the inner lining of the bottom partially removed.

Similar letters of reference indicate corresponding parts in both the figures.

My invention relates to an improvement in the construction of vats used and employed by distillers to contain the mash, wort, or wash of grain, molasses, and other material during the period of fermentation.

Practical distillers and persons familiar with the process of distillation of grain and other materials generally used for the production of spirits know that in the fermentation of the mash, wort, or wash in the wooden vats ordinarily employed for such purpose, a large loss of alcoholic spirits is occasioned by the acidification of the spirit-yielding substances, resulting from changes of temperature in the mash caused by changes in the temperature of the external air, and from which the wooden vat cannot protect; also, by the tendency of the wooden vat to become foul, sour, and acidulated by the acids of the fermenting mash, wash, or wort.

To attain a perfect fermentation of the mash, wort, or wash, it must be contained in a vat capable of preserving its temperature uniform, and uninfluenced and unaltered by any changes of temperature in the external air, and which will not acidify its spirit-giving properties during the fermenting period.

The object of my invention is to attain a complete and perfect fermentation of the mash, &c., by constructing the vats so as to prevent the changes of temperature of the external air from influencing the fermenting mash, &c., and which cannot, during the fermenting period, become soured or acidulated by the acids of the fermenting mash, &c.

To this end I build an above-ground vat, of cylindrical or any other suitable shape, of brick or cut stone, A, the thickness of which will depend on the size and capacity of the vat. This structure is incased in an outer covering, C, made of wooden planks, held together and clamped closely against the brick wall by iron hoops or bands $a$, the wood acting as a non-conductor of heat, and also preventing sweating of the wall. Next, the inside of the vat on sides and bottom is lined with a coating, B, of cement (preferably hydraulic cement) about half an inch in thickness, which should be carefully finished to present a smooth and even surface, after which the vat is complete.

By means of vats constructed as above described a fermentation of uniform temperature and free from acidification may be accomplished, thereby securing a complete conversion of spirit-yielding properties in the mash, &c., into alcoholic spirits.

The advantages of my invention are its durability, imperviousness to acids generated and formed by the fermentation of mash, wort, or wash, its not becoming sour or acidulated, and its non-conductibility of heat.

I am aware that cisterns for containing water to be used for drinking and other similar purposes have been constructed of brick, stone, and other materials and cement; but,

Having thus described my invention, what I claim, and desire to secure by Letters Patent, is—

The described above-ground fermenting-vat, composed of a wall and bottom, A, of masonry, provided with an outer casing of wood, C, and an inner lining of cement, B, as and for the purpose set forth.

In testimony whereof I affix my signature in presence of two witnesses.

MARTIN V. MONARCH.

Witnesses:
JOHN WANDLING,
E. H. TYLER.